D. McKenzie.

Wood Pavement.

No. 3,208. Reissued Nov. 24, 1868.

Witnesses.
W. C. Ashkettle
Wm A. Morgan

Inventor.
D. McKenzie
per Munn & Co
Attorneys

N. PETERS, PHOTO-LITHOGRAPHER, WASHINGTON, D. C.

United States Patent Office.

DUNCAN McKENZIE, OF BROOKLYN, NEW YORK.

*Letters Patent No.* 79,674, *dated July* 7, 1868; *reissue No.* 3,208, *dated November* 24, 1868.

IMPROVED WOODEN PAVEMENT.

The Schedule referred to in these Letters Patent and making part of the same.

*To all whom it may concern:*

Be it known that I, DUNCAN McKENZIE, of Brooklyn, in the county of Kings, and State of New York, have invented a new and useful Improvement in Wooden Pavements; and that the following description, taken in connection with the accompanying drawings, hereinafter referred to, forms a full and exact specification of the same, wherein I have set forth the nature and principles of my said improvement, by which my invention may be distinguished from all others of a similar class, together with such parts as I claim, and desire to have secured to me by Letters Patent.

This invention relates to a new and useful improvement in wooden pavements of that class which are constructed of blocks, laid with the grain in a vertical position, and placed in parallel rows, with a space or recess allowed between the rows to receive sand and serve as a foot-hold for horses.

The invention consists in connecting the rows of wooden blocks by means of dovetail wooden strips attached to the sides of the blocks, and arranged in such a manner that when the pavement is laid it will be retained in proper position, or at the proper level, the several blocks sustaining each other throughout the entire length of the pavement.

In the accompanying sheet of drawings—

Figure 1:
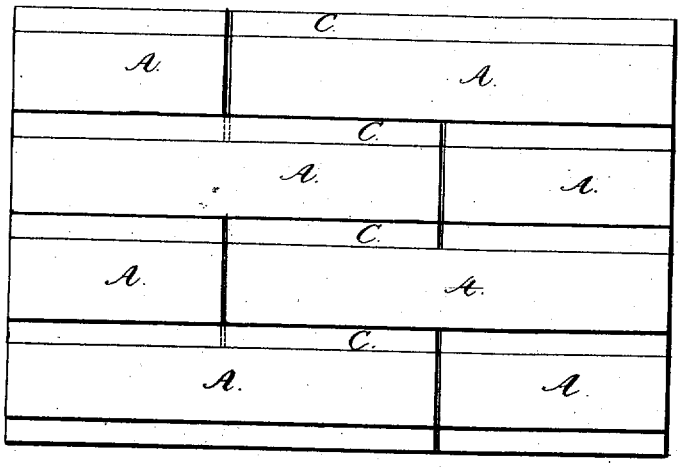

Figure 1 is a plan or top view of my invention.

Figure 2:
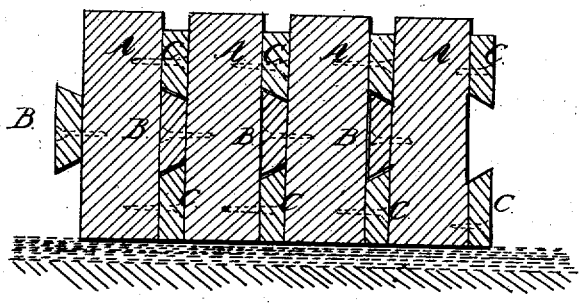

Figure 2, an end view of the same.

Similar letters of reference in each of the figures indicate corresponding parts.

A represents the blocks of wood of which the pavement is constructed.

Any suitable timber may be used, but spruce plank, from three to four inches thick, and cut into lengths, say of eight inches, will probably be the most desirable.

These blocks are set with the grain of the wood in an upright position, as shown clearly in fig. 2, and to one side of each block there is attached, horizontally, by nails or otherwise, a wooden strip, B, having bevelled or dovetail upper and lower surfaces, as shown in fig. 2.

To the other side of the blocks there are attached, horizontally, two wooden strips, C C, a space being allowed between them, and the inner edges of these strips are bevelled, or of dovetail form, corresponding to the upper and lower surfaces of the strips B, the space between the strips C C being of such a width as to receive the strips B, as shown clearly in fig. 2.

By this arrangement it will be seen that the blocks A, when fitted together and laid for a pavement, will be in parallel rows, and connected together by dovetail fastenings or locks, the blocks being laid so as to "break joints," as it is commonly termed. (See fig. 1.)

The upper strips C are a short distance below the upper surfaces of the blocks A, so as to leave a space to receive sand, the blocks, as they are laid, being covered or dipped in coal-tar, and the top of the pavement covered with a coat of said tar, and the spaces between the blocks then filled with sand.

The blocks A may be laid on a concrete or plank foundation, the street, of course, being properly graded previous to laying the foundation.

I would remark that, instead of the double dovetail arrangement, as above described, a single dovetail may be employed; that is to say, the upper strips C may be dispensed with.

I find, in practice, that the single dovetail arrangement will answer equally as good a purpose as the double one.

I do not claim broadly the use of the dovetail strips for securing wooden paving-blocks together, as I am aware that this has been done before; but, What I do claim as new, and desire to secure by Letters Patent, is—

The wooden pavement, constructed, as described, of the blocks A, secured together by means of the bevelled strips attached to the opposite sides of said blocks, so as to form either a single or double dovetail or lock, substantially as herein set forth.

DUNCAN McKENZIE.

Witnesses:

H. L. WATTENBERG,

A. R. HAIGHT.